Patented Aug. 5, 1947

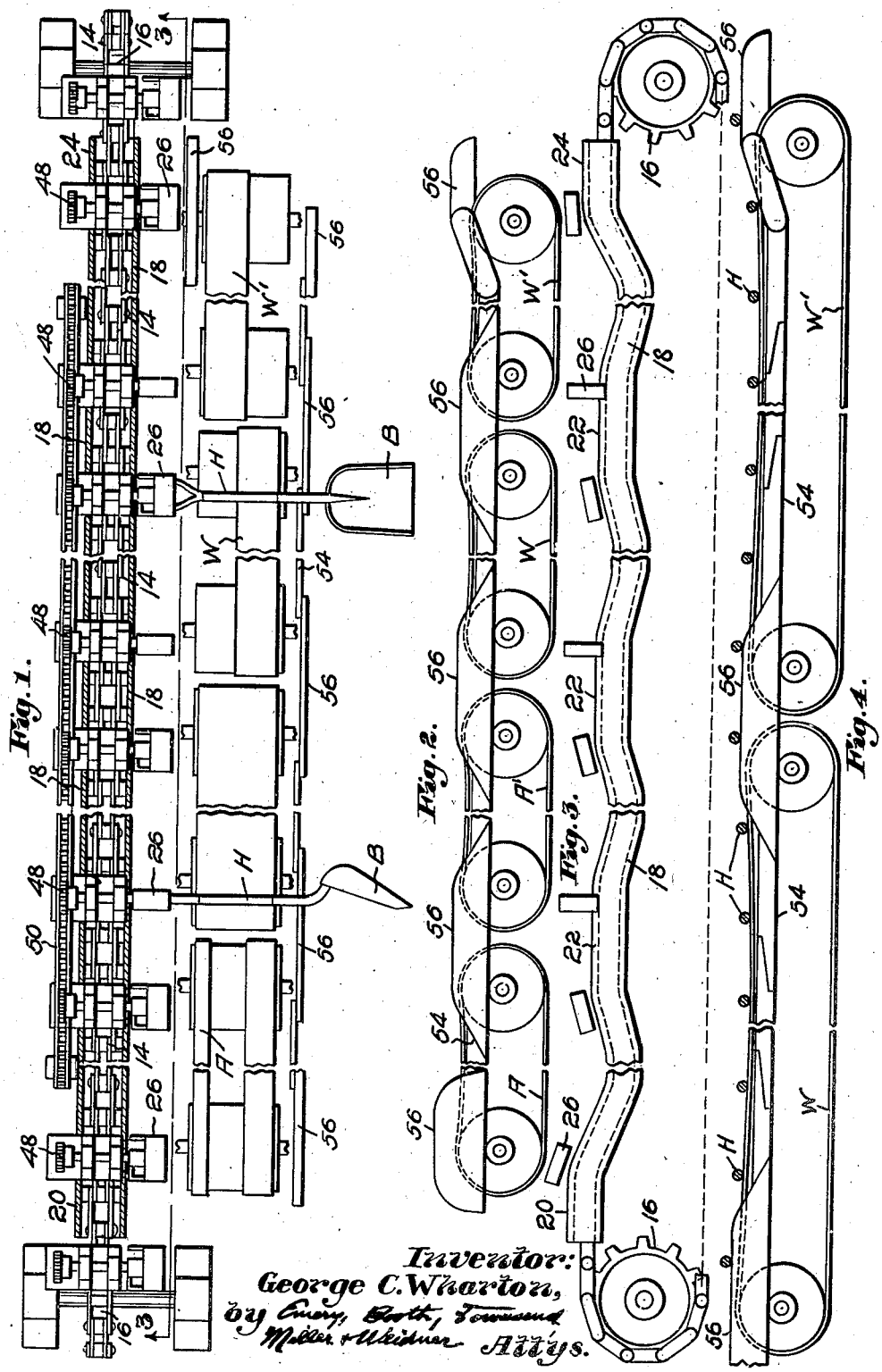

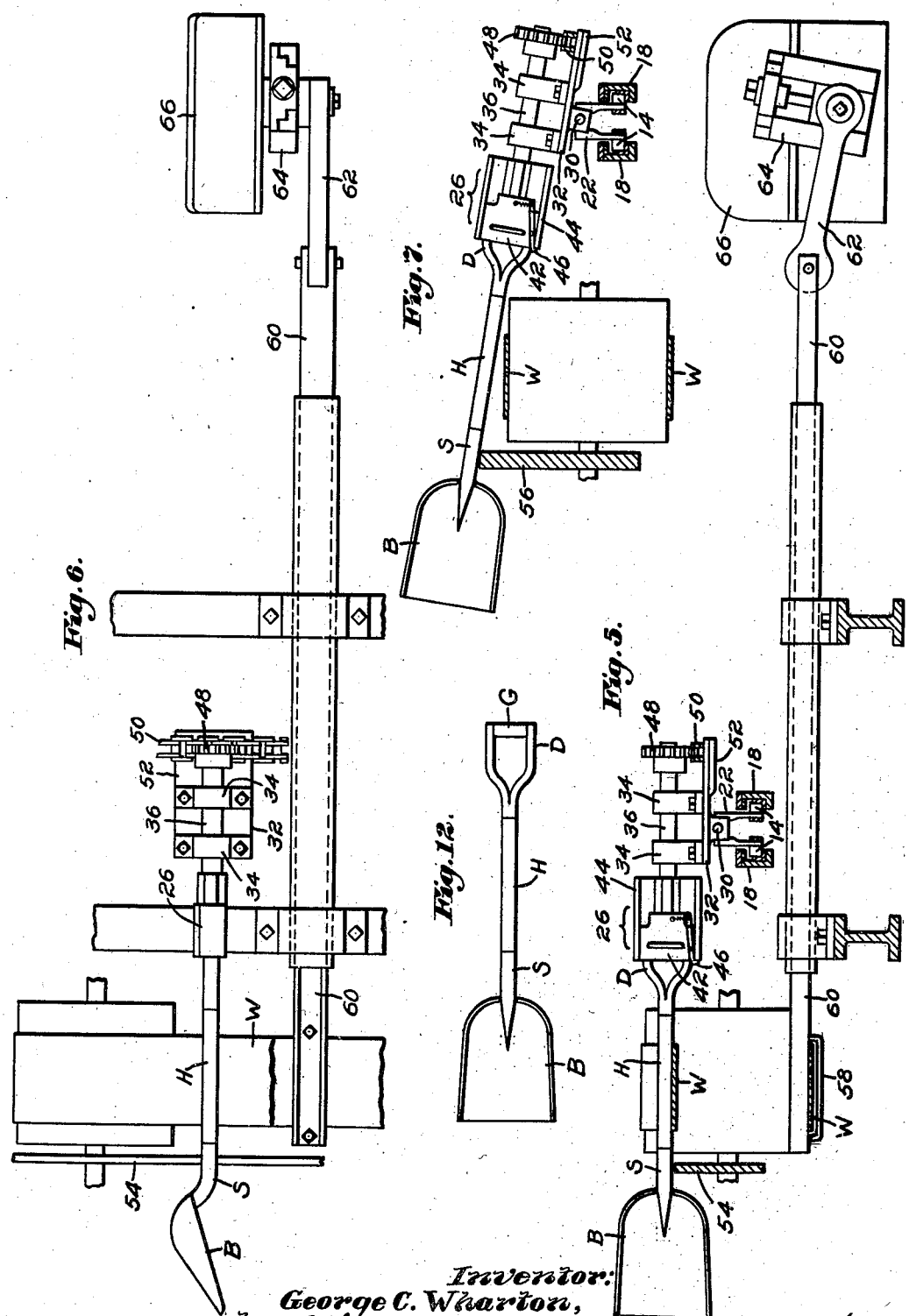

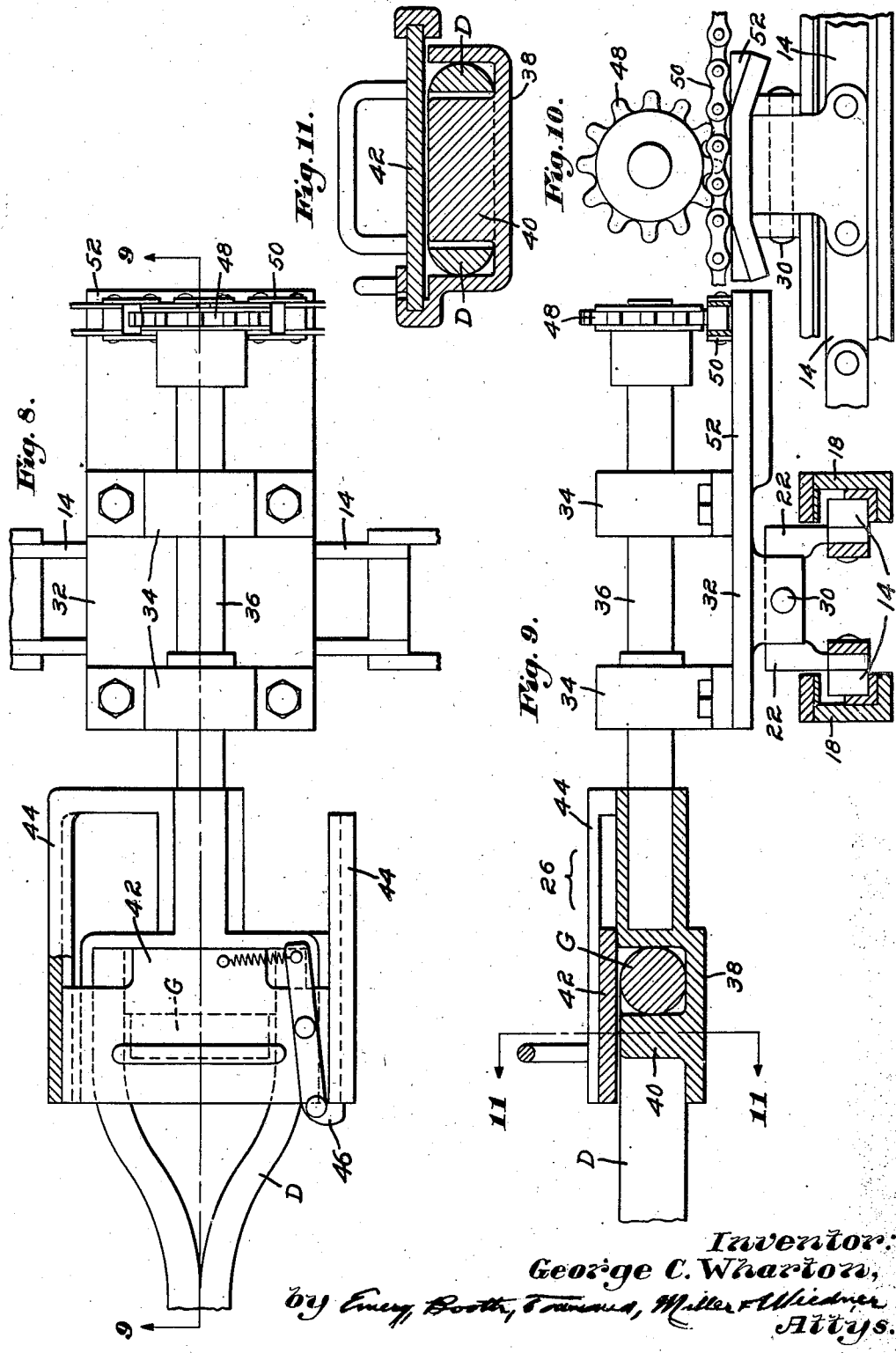

2,425,290

UNITED STATES PATENT OFFICE 2,425,290

MACHINE FOR FINISHING THE HANDLES OF SHOVELS

George C. Wharton, Parkersburg, W. Va., assignor to Ames Baldwin Wyoming Co., Parkersburg, W. Va., a corporation of Delaware Application October 24, 1941, Serial No. 416,345

6 Claims. (Cl. 51—138)

This invention relates to the finishing of the handles of shovels or similar headed tools, and the object is to provide a machine whereby the wooden handles of shovels, more particularly complete shovels, that is, shovels or the like with handle and blade permanently secured together, may be smoothed or polished as by sanding or waxing or by both sanding and waxing. The machine is also adapted for the finishing of handles as such as, for instance, handles which are to be sold for repair purposes, especially when such handles are of the bent type and embody a cranked or offset portion which presents a problem in handling somewhat similar to that presented by an attached blade. However as I anticipate that the major field of utility of the machine will be found in the case of complete shovels, I shall for convenience hereinafter refer to them as the articles being operated upon.

My invention will be well understood by reference to the following description of the illustrative embodiment thereof shown by way of example in the accompanying drawings, wherein:

Fig. 1 is a plan view of the machine with parts broken away, the view being partly diagrammatic because supporting frames, driving motors, connections for the latter, and the like have been omitted or broken away;

Fig. 2 is a similarly diagrammatic, partial front elevation as seen from the lower side of Fig. 1;

Fig. 3 is a similarly diagrammatic section on line 3—3 of Fig. 1;

Fig. 4 is a view similar to Fig. 2 of a portion of the length of the latter;

Fig. 5 is a fragmentary enlarged section on line 5—5 of Fig. 1;

Fig. 6 is a corresponding plan;

Fig. 7 is a view similar to Fig. 5 showing the parts at a different position along the length of Fig. 1;

Fig. 8 is an enlarged plan of the shovel holder;

Fig. 9 is a section on line 9—9 of Fig. 8;

Fig. 10 is a fragmentary end elevation of Fig. 9 as seen from the right;

Fig. 11 is a section on line 11—11 of Fig. 9; and

Fig. 12 is a view of a D-handled shovel.

The particular machine here shown is adapted both to sand and to wax the shovel handles and for convenience in the following claims I shall denote either operation or a similar operation by the word "polishing." The machine shown is designed to operate on shovels of the type having a so-called D handle, although the invention is not limited thereto. In my copending application, Serial No. 416,344, now Patent No. 2,406,728, issued August 27, 1946, to which the present application is subsidiary. I show a machine more particularly designed for handling shovels having long straight handles or stales. For convenience I shall refer to the object operated on as a shovel. The machine may be operated to perform a like operation on tools similarly embodying a handle and a head. Thus a spading fork is similar to a D-handle shovel.

Shovel handles obviously should be finished smooth. In the better grade goods they are also usually finished by waxing since besides certain practical objections to painting it is associated in the mind of the public with lower grade goods wherein the coating conceals defects in quality. While many attempts have been made to permit the blade and handle to be finished separately before assembly, the finish is likely to be marred in the process of securing the blade and handle together, and therefore the finishing of the handle has been performed on the complete shovel which has been presented by hand to suitable buffing devices. Since a shovel, when held otherwise than in the normal digging position, is awkward and unwieldy, the finishing has been difficult and expensive. Machines in accordance with the present invention in contrast permit rapid, economical polishing of the handle in the complete shovel.

In Fig. 11 I have illustrated a shovel of the D-handle type embodying the blade B from the back end of which projects a metallic socket S integral with or rigidly secured to the blade and receiving the wooden handle H. The socket is cranked or bent to provide a proper lift to the shovel. Outwardly of the socket the handle extends as an axially straight stem or shank usually corresponding to a solid of revolution and to the distal end thereof is secured the so-called D-handle D, herein embodying a socket fitting the outer end of the shank or stem H and having flaring arms which support the cross-member or grip proper G. The presence of the enlarged blade disposed at an angle to the axis of the shank is the primary cause which has rendered the polishing operation of the shank difficult as hitherto practiced.

The machine which I am about to describe in detail provides for positioning the shovels by means of the D grips and revolving the straight shank portion H about their axes in contact with suitable polishing surfaces, the blades during this operation projecting at one side of these surfaces and gyrating idly out of contact therewith.

Referring now to the drawings, particularly

Fig. 1 thereof, the machine shown embodies two sanding belts A and A', the first of which is preferably of a duplex construction, as hereinafter described, and two waxing belts W and W'. These are disposed in a row with their lengths in alignment, being mounted on suitable supporting pulleys, one pulley for each belt being suitably driven by means not shown. In Fig. 1 I have shown a shaft projecting from one pulley of each belt but broken away. In practice these shafts extend to motors located at the further side of the machine, the upper side viewing Fig. 1. In order to bring Fig. 1 into the compass of a sheet of patent drawings the central portions of the belts have been broken away. While their lengths may vary, in an embodiment of the machine which I have commercially operated the distance between the centers of the supporting pulleys for each belt is about ten feet.

Along one side of the series of belts, the upper side in Fig. 1, there is a chain conveyor 14 trained about terminal sprockets 16 so that the upper run thereof, as seen in Fig. 1, travels from left to right along the series of belts, this run being for the greater portion of its length substantially at the elevation of the upper runs of the several polishing belts. The upper run of the chain conveyor may move through a guide housing which supports a portion 20 thereof near the entrance end of the machine, the left-hand end viewing Fig. 1, at a greater elevation, as best seen in Fig. 3, providing a loading station, raised portions 22 at the intervals between the successive belts and a raised portion 24 at the right-hand end providing an unloading station.

Suitable holders 26 on the chain are adapted to hold the D grips of the shovel so that the latter is carried from the chain in overhanging relation with the shank H extending across the several polishing belts and preferably sagging into contact with the same while the blades B project at the opposite side of the belt. The chain 18 operates to feed the shovels along the belts, which themselves are driven, and the shovels during this feeding process are positively rotated about their axes causng an epicyclic polishing movement while the blades, being beyond the belt, move freely in the clear. The construction of the holders 26 is best seen in Figs. 8 to 11. The chain carries blocks 28 in which are journalled longitudinal pivot shafts 30 supporting base members 32 having journals 34 in which are received the transversely extending shafts 36 on one end of which are the holders proper. This may have the general form of a rectangular box 38 open at the top and at the end which is nearer the belts, into which box the cross-grip G and the sides of the arms of the D grip snugly fit. From the bottom of the box rises a projection 40 entering the open center of the D. A sliding cover 42 for the top of the box may be pushed back along rearwardly extending rails 44 to permit the D-handle to be inserted into the box in embracing relation to the projection 40 by a movement of superposition from above with the shank H substantially aligned with the shaft 36. When the cover is drawn forward, it is retained by a spring-pressed latch 46 and it locks the shovel in position.

On the other end of the shaft 36 is a sprocket wheel 48 which is adapted to run on a fixed length of sprocket chain 50 extending along the machine conveniently substantially between the centers of the terminal pulleys for the first and last belts A and W'. A projection 52 from base member 32 underrides the chain and keeps it in mesh with the sprocket.

It will be clear from Fig. 5 that the shank H will be carried by the chain conveyor 14 in contact with the top run of a belt and may sag about the shaft 30 toward the surface of the belt under the weight of the blade B. As it travels, preferably in the direction opposite to the movement of the polishing belts, the engagement of the sprocket chain 50 with the sprocket 48 rotates the shaft 36 and hence the shovel, preferably so that the contacting surface moves against the direction of travel of the polishing belts. The blade B overhangs the opposite side of the polishing belt, the lower side in the plan view, Fig. 1, and is thus in the clear and presents no impediment to the motions described.

To prevent the shovel from fouling the pulleys of the belts, the chain conveyor may, as has been previously described, be elevated by the guide housing 20 at 20 and 24 at each end of the machine and at the locations 22 between successive belts so that the shovel is lifted at the ends of the belts and lowered onto the polishing surface. Narrow supporting boards at the opposite side of the belts, as shown in Figs. 1, 2 and 4, provide cam-like rise portions 56 to underride the sockets S of the shovel blades at these points, as best seen in Fig. 7, and so lift the blade ends of the shovels to effect this transfer since otherwise the shovels might sag about pivot shafts 30 into the space between the belts.

As the various holders come up at the left-hand end of the machine, viewing Fig. 1, the covers 42 of the holders 26 will be found in the slid back position due to unloading of the holders at the other end of the machine and a shovel is inserted and locked in position by sliding the cover forward again. The shovel is then carried along with the shank H in contact with the belts and in its travel is rotated about the axis of the shank. At the right-hand end of the machine the covers are unlatched and slid back and the finished shovels are removed.

Referring to Fig. 1, it will be noted that the first sanding belt A shown in fact consists of two relatively narrow, spaced belts. One of these, the lower in Fig. 1, is located in alignment with the joint between the wooden shank H and the socket S while the other is in alignment with the joint between H and the metallic socket of the D-handle. These belts, therefore, serve to cut down the wood at these spots to form an even joint where the handle enters the sockets. The wider belt A' cooperates with the whole suface of the handle shank H.

Referring to Figs. 1 and 6, it will be noted that the waxing belts W and W' are there shown as relatively narrow although mounted on wide pulleys. The purpose of this is to permit a movement of the belt axially of the handle shank H as the latter moves along. For this purpose, as best seen in Figs. 5 and 6, the lower run of the belt may be engaged by a loop 58 similar to that of a belt shifter carried on a sliding bar 60 in the nature of a cross-head driven by a connecting rod 62 from an adjustable crank 64 which takes motion from suitable gearing housed in gear box 66 and driven from a suitable power shaft (not shown) of the machine. This causes a movement of the belt back and fourth along the face of the pulleys as the polishing operation proceeds.

It will be understood that the holders 26 are provided at short intervals along the chain conveyor 14 and that in the normal operation of the machine a multiplicity of shovels are traversing the several polishing belts, although in Fig. 1 only two shovels are drawn.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A polishing apparatus comprising a polishing belt, a chain conveyor paralleling the belt along one side thereof, journal blocks pivoted on axes longitudinal of the conveyor, receivers journalled in the blocks to rotate about axes transverse to the conveyor and having parts to fit about and within a D grip, the receivers having movable covers which when closed confine the grips in the receivers, sprockets on the axes of the receivers, a fixed chain meshing with the sprockets and means to drive the conveyor.

2. A polishing apparatus for the shanks of complete shovels comprising a pair of aligned polishing belts, a conveyor paralleling one side thereof having holders to receive the outer ends of the shanks to support the shovels with the shanks across the belts and the blades suspended on the further side, the holders being pivoted to permit the shovels to sag downwardly toward the belts, and means on said further side between the belts to underride the blade ends as the shovels pass from one belt to the other.

3. A polishing apparatus for the handles of complete shovels comprising a polishing belt, a holder at one side thereof to grasp the rear end of the shovel handle to retain and carry it in overhanging relation with its shank opposed to the belt and the blade projecting beyond the opposite side, the said opposite side of the belt being unobstructed in the path of the blade, means for traversing the holder along said side of the polishing belt, means for rotating the holder, and means for oscillating the upper run of the belt transversely while the shank makes complete revolutions in contact therewith.

4. A polishing apparatus for the shanks of complete shovels having a cross grip comprising a longitudinally extended polishing surface, a conveyor paralleling the length thereof at one side, a holder on the conveyer to receive the grip and support the shovel in overhanging relation with its shank opposed to the surface and its blade at the other side thereof, the holder being pivoted to the conveyor to permit the shank to sag downwardly against the surface, means to drive the conveyor, and means to rotate the holder as it is traversed by the conveyor along the surface.

5. In an apparatus for polishing the straight wooden shanks of shovel handles the constituent mechanism comprising a base having journals, a shaft therein, a holder at one end of the shaft constructed to receive a D handle and hold the same against movement in three relatively perpendicular directions relative thereto to retain and carry the shovel with its shank extending in overhanging position outwardly of the holder in alignment with the shaft and means on the shaft for rotating the same.

6. In an apparatus for polishing the straight wooden shanks of shovel handles the constituent mechanism comprising a member having a base mounted thereon for pivotal movement about an axis, the base having journals the axis of which extends transversely to the pivotal axis, a shaft in the journals, a holder at one end of the shaft constructed to receive and support a D handle with the shovel shank extending in alignment with the shaft and means at the other end of the shaft for rotating the same.

GEORGE C. WHARTON.

REFERENCES CITED

The following references are of record in the file of this patent:

UNITED STATES PATENTS

| Number | Name | Date |
|---|---|---|
| 286,707 | Kennan | Oct. 16, 1883 |
| 339,125 | Allen | Apr. 6, 1886 |
| 781,423 | Hemming | Jan. 31, 1905 |
| 1,193,673 | Delbauve et al. | Aug. 8, 1916 |
| 1,740,247 | Kiefer | Dec. 17, 1929 |